US 8,646,571 B2

(12) United States Patent
Aliev

(10) Patent No.: US 8,646,571 B2
(45) Date of Patent: Feb. 11, 2014

(54) APPARATUS FOR CREATING ACOUSTICALLY BENEFICIAL CONDITIONS FOR AUDIO AND VOICE RECORDING

(76) Inventor: Adil Aliyevich Aliev, Jefferson, MD (US)

(*) Notice: Subject to any disclaimer, the term of this patent is extended or adjusted under 35 U.S.C. 154(b) by 0 days.

(21) Appl. No.: 13/527,525

(22) Filed: Jun. 19, 2012

(65) Prior Publication Data
US 2013/0333976 A1 Dec. 19, 2013

(51) Int. Cl.
*A47B 81/06* (2006.01)

(52) U.S. Cl.
USPC .................................. 181/198; 181/30

(58) Field of Classification Search
USPC .................................... 181/198, 30
See application file for complete search history.

(56) References Cited

U.S. PATENT DOCUMENTS

| 4,942,938 | A  | * | 7/1990  | Wiegel            | 181/30  |
|-----------|----|---|---------|-------------------|---------|
| 5,123,874 | A  | * | 6/1992  | White, III        | 454/251 |
| 6,085,861 | A  | * | 7/2000  | Jines             | 181/30  |
| 7,610,810 | B2 | * | 11/2009 | Winker            | 73/571  |
| 7,815,011 | B2 | * | 10/2010 | Holzman et al.    | 181/30  |
| 8,069,946 | B1 | * | 12/2011 | Cruise, III       | 181/198 |
| 8,136,626 | B1 | * | 3/2012  | Aliev             | 181/198 |
| 2006/0060420 | A1 | * | 3/2006 | Freiheit          | 181/287 |

* cited by examiner

*Primary Examiner* — Forrest M Phillips

(57) ABSTRACT

An apparatus for creating acoustically beneficial conditions for audio and voice recording on the go, in limited space and/or time conditions with sound absorbing inner layer made out of flexible durable material such as acoustic blankets. A preferred embodiment includes supportive rigid elements, internal light and copy support elements and durable outer layer. Acoustic layer can be extended to increase the area of coverage, it can be set up and operational from folded down transportation state in under 20 seconds and put away as quickly, it is light weight, washable and can be used as a travel bag when traveling.

20 Claims, 4 Drawing Sheets

APPARATUS FOR CREATING ACOUSTICALLY BENEFICIAL CONDITIONS FOR AUDIO AND VOICE RECORDING

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Referring now to FIGS. 1-4 there is shown a portable apparatus for creating acoustically beneficial conditions for audio and voice recording.

Figure 1:
FIG. 1 is a perspective view of the invention being used.

Referring now to FIG. 1 there is shown an overview of the invention 10 in use where a user is positioned in front of the apparatus and a recording device is positioned inside the invention.

Figure 2:
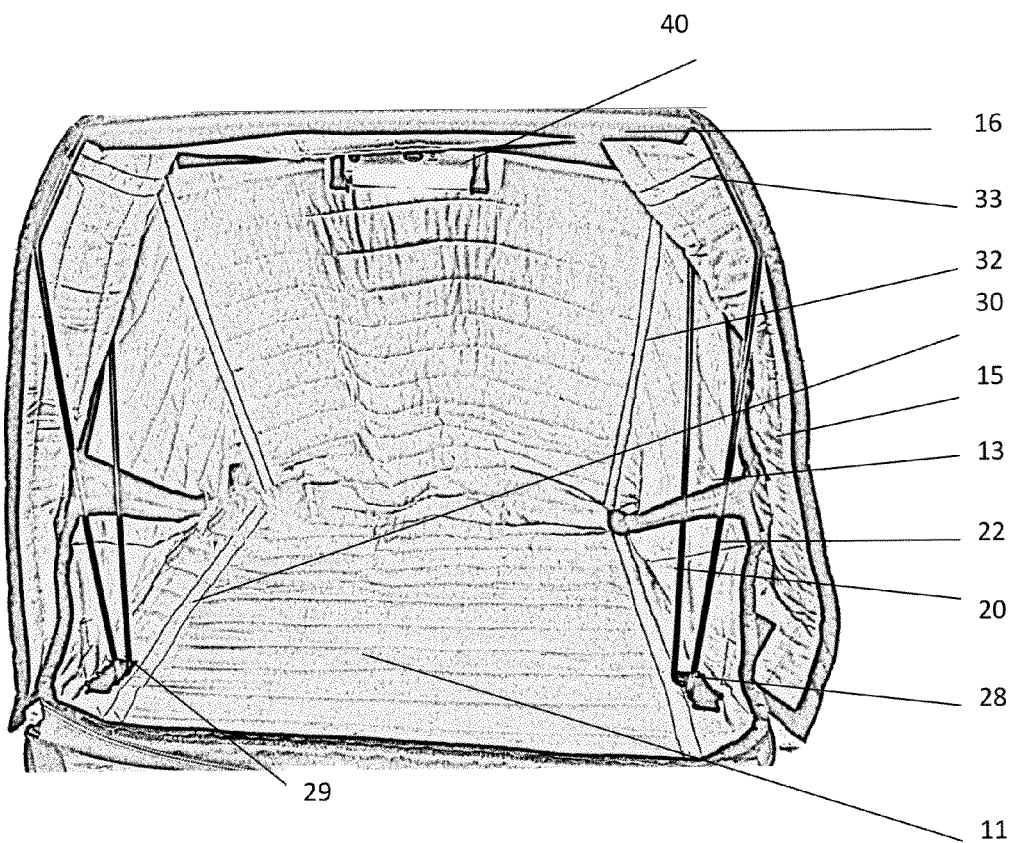
FIG. 2 is a front view of the invention in its operational state.

Referring now to FIG. 2 there is shown the front view of the invention in preferred configuration comprising an inner sound absorptive layer 11 made out of absorption sheet material such as quilted sound blankets, in operational state forming a half dome-like enclosure. The upper portion of the apparatus is supported by plurality of rigid elements such as arches 20 and 22, releasably fixed into the bottom arch holders 28 and 29 and top holder(s) 16. Plurality of other rigid elements such as 30, 32, and 33 further help to maintain the shape of the enclosure. An extension flap(s) 15 of the sound absorptive material 11 provide additional coverage and the option to adjust the shielding area of the enclosure. The said plurality of the rigid elements also may be used to support accessories, such as internal light 40, microphone, copy holders etc. In addition the apparatus may have plurality of openings 13 for attachments, such as electric cables, which can be releasably sealed with hook and loop type of closure (such as Velcro), buttons, zippers, buckles or any other suitable type of closure.

Figure 3:
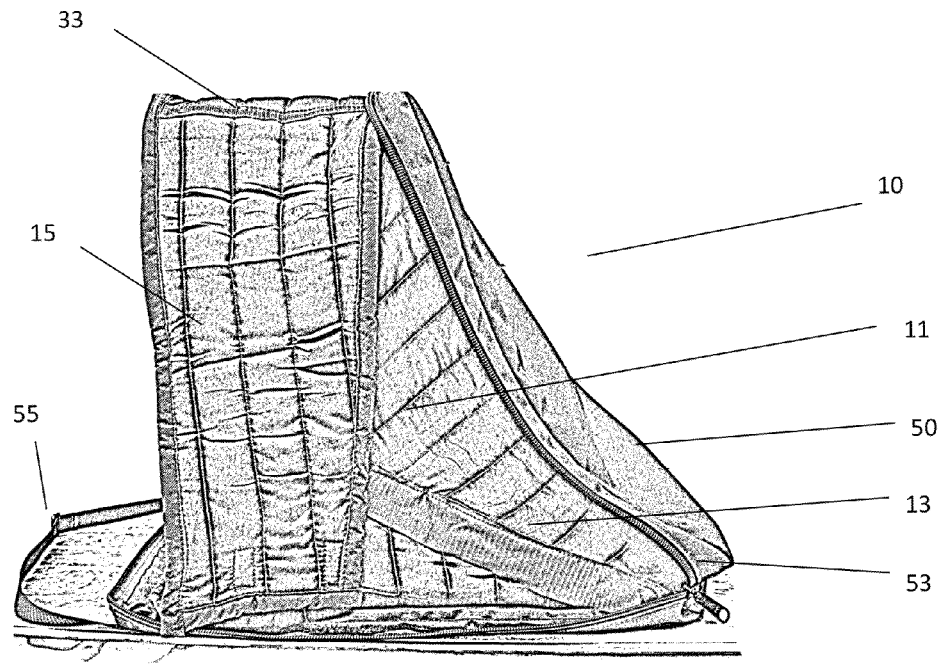
FIG. 3 is a side view of the invention in its operational state

Referring now to FIG. 3 there is shown the side view of the invention in operational state with outer layer 50 of abrasive resistant, durable material such as nylon, canvas, vinyl, et cetera. The outer layer 50 may be releasably attached to the sound absorptive inner layer 11 and in the folded state the booth can be closed shut with a zipper 53 or other suitable closure. Handles and a shoulder strap 55 may be attached to the outer layer to facilitate carrying the invention in transit.

Figure 4:
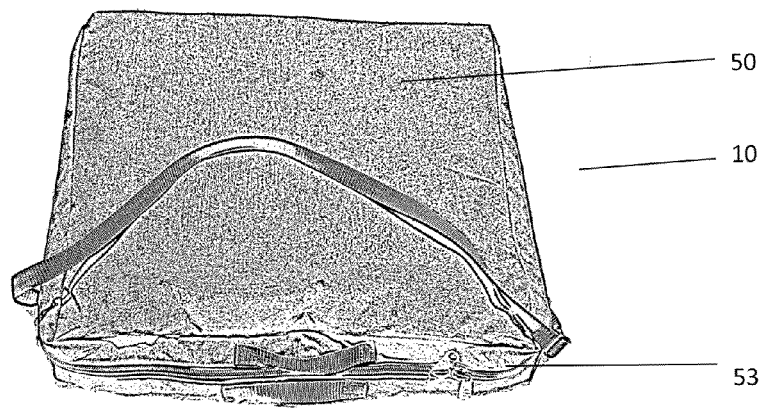
FIG. 4 is a perspective view of the invention in closed state.

Referring now to FIG. 4 there is shown the invention 10 in closed state with closure 53 shut and ready to be carried on the road.

Figure 5:
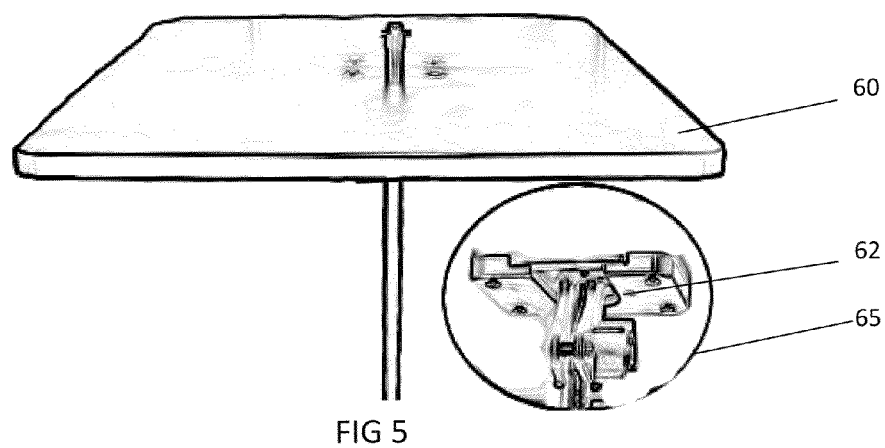
FIG. 5 is a perspective view of the support platform mounted on vertical support with removable bracket close up.

Please add the following description:

Referring now to FIG. 5 there is shown the perspective view of the support platform 60 of the invention mounted on a vertical support, such as microphone stand, that is going through a special opening in the platform. Said platform 60 can be fixed to the vertical support by a bracket. In the preferred embodiment the bracket is removable and consist of a non-removable portion 62 permanently attached to the platform and removable portion 65.

Figure 6:
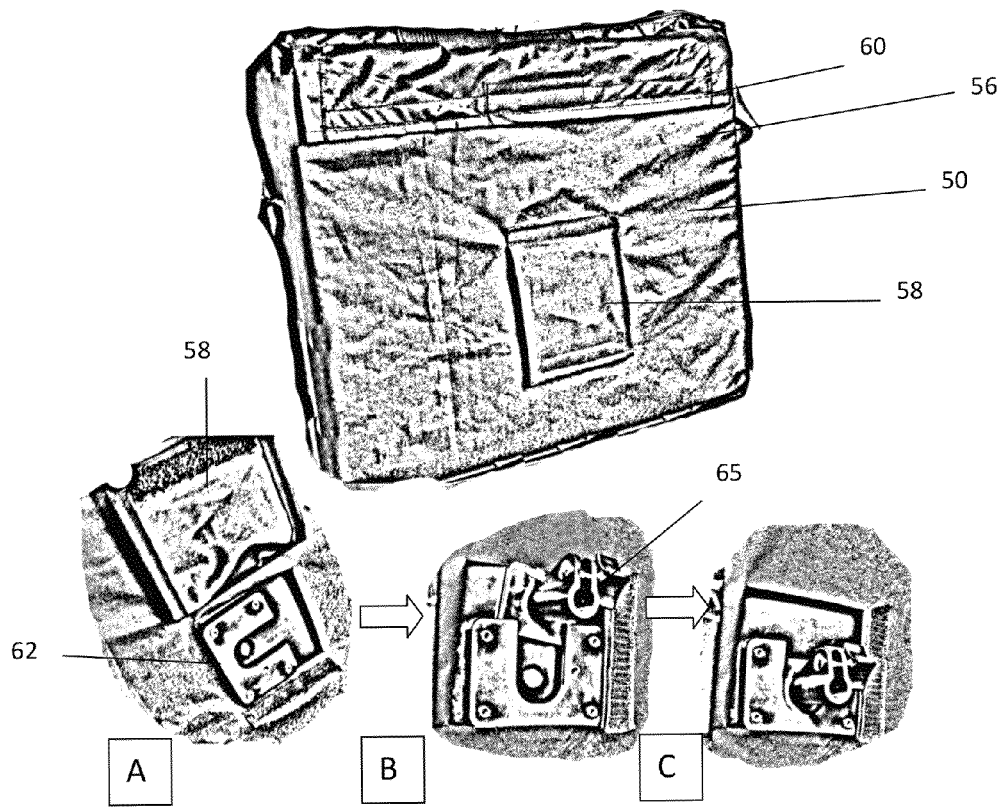
FIG. 6 is a perspective view of the support platform bracket mount assembly.

Please add the following description:

Referring now to FIG. 6 there is shown the view on the bottom portion of the invention in the transport state. The support platform 60 nested in the pocket 56 of the outer case 50. Flap 58 allows access to the bracket of the support platform 60 without having to remove it from the case. Now referring to drawings A, B and C of the FIG. 6 is shown how to engage/disengage the removable bracket 65. To insert the bracket, lift flap 58 to expose bracket portion 62, then slide the removable portion of the bracket 65 in the slot of the non-removable bracket portion 62 as shown on drawing B and C.

It is conceivable that the outer shell may be made of various suitable materials flexible or rigid, soft or hard. Further, if the outer shell made with rigid material one can attach the inner sound absorption layer to the outer shell using it in a manner described above for rigid elements of the preferred embodiment. It is also conceivable that the shape of the enclosure can be other than half dome, as described in the preferred embodiment. It is also shod be noted that design, shape and construction material of the support platform and brackets can vary as long as it supports the bottom portion of the invention from sagging.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A collapsible and portable apparatus for creating acoustically beneficial conditions for audio and voice recording comprising:
   A lightweight frame; comprising moveable and detachable rigid supportive elements;
   A sound absorbing inner layer of non-foam acoustic blanket material;
   Wherein the inner layer further comprises extensions of sound absorbing material to increase the area of coverage;
   A durable protective outer layer;
   And resealable side openings.

2. The apparatus for creating acoustically beneficial conditions for audio and voice recording as claimed in claim 1 further comprising resealable side openings that can be used for access for wires and cables, and such.

3. The apparatus for creating acoustically beneficial conditions for audio and voice recording as claimed in claim 1 further comprising sound absorbing flaps that can be opened or closed, therefore increasing or decreasing sound absorption surface.

4. The apparatus for creating acoustically beneficial conditions for audio and voice recording as claimed in claim 1 further comprising at least one extension of sound absorbing material to increase or decrease the acoustically shielded area.

5. The apparatus for creating acoustically beneficial conditions for audio and voice recording as claimed in claim 1 further comprising design features that make the internal surface of the apparatus asymmetrical.

6. The apparatus for creating acoustically beneficial conditions for audio and voice recording as claimed in claim 1 further comprising asymmetrical design elements of the internal surface of the apparatus that allows it to serve as efficient sound diffuser, as well as absorber.

7. An apparatus for creating acoustically beneficial conditions for audio and voice recording as claimed in claim 1 wherein said sound absorbing inner layer is washable, including machine washable.

8. The apparatus for creating acoustically beneficial conditions for audio and voice recording as claimed in claim 1 further comprising durable outer casing.

9. The apparatus for creating acoustically beneficial conditions for audio and voice recording as claimed in claim 1 further comprising internal light and copy support elements.

10. The apparatus for creating acoustically beneficial conditions for audio and voice recording as claimed in claim 8 further comprising at least one of shoulder straps or carry handles.

11. An apparatus for creating acoustically beneficial conditions for audio and voice recording as claimed in claim 8 wherein sound absorbing inner layer is removably attached.

12. The apparatus of claim 1 further comprising carrying means consisting of a shoulder strap, carrying handles and combinations thereof.

13. The apparatus of claim 1 wherein said sound absorbing inner layer is removable.

14. The apparatus of claim 1 wherein the apparatus is adjustable to allow for more or less ambient sound to enter the apparatus.

15. The apparatus of claim 10 wherein the apparatus can be collapsed into a transportation state, and when in said transportation state provides sufficient internal space that the apparatus can be used as a travel bag.

16. The apparatus of claim 1 further comprising rigid flat support platform, that can be removable.

17. The apparatus of claim 16 further comprising means for being mountable on a vertical support, such as microphone stand.

18. An apparatus of claim 16 that can be used, mounted or as lap top.

19. An apparatus of claim 16 that can be suspended, on a hook or on the user him/herself for hands free use of the apparatus.

20. The apparatus of claim 16 further comprising a rigid attachment for mounting accessories, such as miniboom, microphone, copy holder and such, on it instead of a microphone stand, that can be removable. Said rigid attachment can remain installed even if the apparatus is closed for transportation.

* * * * *